(12) United States Patent
Tillema

(10) Patent No.: US 11,226,901 B2
(45) Date of Patent: Jan. 18, 2022

(54) PROGRAMMABLE BROADCAST ADDRESS

(71) Applicant: HEWLETT PACKARD ENTERPRISE DEVELOPMENT LP, Houston, TX (US)

(72) Inventor: John E. Tillema, Fort Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/527,285

(22) Filed: Jul. 31, 2019

(65) Prior Publication Data
US 2021/0034525 A1 Feb. 4, 2021

(51) Int. Cl.
*G06F 12/0831* (2016.01)
*G06F 9/46* (2006.01)
*G06F 12/0811* (2016.01)
*G06F 9/30* (2018.01)

(52) U.S. Cl.
CPC ...... *G06F 12/0833* (2013.01); *G06F 9/30101* (2013.01); *G06F 9/466* (2013.01); *G06F 12/0811* (2013.01)

(58) Field of Classification Search
CPC ... G06F 8/654; G06F 12/0811; G06F 12/0833
See application file for complete search history.

(56) References Cited

U.S. PATENT DOCUMENTS

| | | | |
|---|---|---|---|
| 5,122,691 A * | 6/1992 | Balakrishnan | G06F 13/409 326/86 |
| 9,983,889 B1 * | 5/2018 | Sarmah | G06F 9/4401 |
| 10,355,909 B1 * | 7/2019 | Ho | H04L 67/1095 |
| 2003/0056052 A1 * | 3/2003 | Ehmann | G06F 13/423 710/305 |
| 2006/0233171 A1 * | 10/2006 | Murray | H04L 12/185 370/390 |
| 2007/0297406 A1 * | 12/2007 | Rooholamini | H04L 45/16 370/390 |
| 2012/0078393 A1 * | 3/2012 | Kotb | H05B 47/19 700/90 |
| 2012/0151561 A1 * | 6/2012 | Kreiner | H04L 12/1845 726/4 |
| 2013/0019213 A1 * | 1/2013 | Panofsky | G06F 30/34 716/101 |
| 2013/0242929 A1 * | 9/2013 | Gorgen | H04W 72/0406 370/329 |

* cited by examiner

*Primary Examiner* — Larry T Mackall
(74) *Attorney, Agent, or Firm* — Nolte Lackenbach Siegel (57) ABSTRACT

A method for initializing functional blocks on an electronic chip includes writing a programmable broadcast address to one or more functional blocks in a broadcast group; setting the one or more functional blocks in the broadcast group to a broadcast enable mode; writing one or more transactions to the programmable broadcast address; and disabling the broadcast enable mode.

20 Claims, 6 Drawing Sheets

PROGRAMMABLE BROADCAST ADDRESS

BACKGROUND

Functional blocks of circuitry on computer chips perform various functions and the nature of these jobs determines the nature of the functional blocks themselves. Functional blocks typically implement logic equations, the outputs of which control some other function present on the chip. During startup, the functional blocks are initialized through the loading of firmware. Multiple instances of functional blocks may perform the same function and be initialized using the same firmware image. For example, a micro-controller may be instanced with two or more logic or functional blocks performing the same functions at different locations on the micro-controller chip. During startup, the same firmware is loaded into each block. Currently, this means that writes are sent to each block to load the firmware and a single firmware image can take ten-thousand or more writes to load into a given block during power on or reset initialization. As the number of similar functional blocks increases, the number of writes of the same firmware increases, increasing the total time for initialization at each power on or reset of the chip.

BRIEF DESCRIPTION OF THE DRAWINGS

The present disclosure may be understood from the following detailed description when read with the accompanying Figures. In accordance with the standard practice in the industry, various features are not drawn to scale. In fact, the dimensions of the various features may be arbitrarily increased or reduced for clarity of discussion.

Some examples of the present application are described with respect to the following figures.

DETAILED DESCRIPTION

Illustrative examples of the subject matter claimed below will now be disclosed. In the interest of clarity, not all features of an actual implementation are described in this specification. It may be appreciated that in the development of any such actual example, numerous implementation-specific decisions may be made to achieve the developers' specific goals, such as compliance with system-related and business-related constraints, which will vary from one implementation to another. Moreover, it may be appreciated that such a development effort, even if complex and time-consuming, would be a routine undertaking for those of ordinary skill in the art having the benefit of this disclosure.

Various micro-chips or semiconductor chips within a computer or computing system may perform various functions. The various chips may be created through a design to manufacture process. The design process may include the layout of transistors on paper or in a graphics computer program. The design process may include using a hardware description language ("HDL") such as Verilog, System Verilog, or Very High Speed Integrated Circuit ("VHSIC") Hardware Description Language ("VHDL"). to describe the chip's functionality. The chips may be or include micro-controllers, converter chips, transmission protocol bridge chips, and other chips.

Each chip may include functions, functional units, or functional blocks and may be described as transistor circuits, at the Register Transfer Level ("RTL"), and/or in HDL design. RTL may be used in HDL design to create high-level representations of a circuit from which lower-level representations and ultimately actual wiring may be derived. Accordingly, each chip may include functional blocks of circuitry formed thereon. The functional blocks may perform one or more functions within each chip. Amongst these functions might be link controllers, serializers/deserializers ("SERDES"), physical layer functional blocks ("PHYs"), switch ports, debug functional blocks, protocol functional blocks such as PCIe controllers, ethernet controllers, and Gen-Z controllers, and clock controllers to name just a few. Any block may be repeated at many locations around a given chip.

To electronically access configuration registers in each functional block of a chip to configure the chip during initialization, each functional block may have a unique address or address range. An initialization controller may write the appropriate image to a given functional block by writing to the unique address. For example, a single firmware image may take ten-thousand or more writes to load into a given block during power on or reset initialization. For each block the same process may be followed. For similar or identical functional blocks that share copies of configuration registers, the firmware image may be sent to each additional block requiring the same number of writes. If there are five functional blocks dispersed at different locations around a chip and each load takes ten-thousand writes, the total writes will be fifty-thousand. If a single write could be sent to all five functional blocks at the same time, forty-thousand writes may be saved, saving precious initialization time, increasing initialization efficiency, and the overall efficiency of each chip.

One approach may be to broadcast the firmware image to each of the affected functional blocks at the same time. Accordingly, each of the affected functional blocks may be designed to be set in a broadcast mode and to assume a programmable broadcast address for receiving transactions while in broadcast mode. Incorporating this capability may include incorporating one or more address decode regions to one or more registers associated with one or more functional blocks to allow creation of programmable broadcast addresses or ranges. The programmable broadcast addresses or ranges may be utilized to broadcast initialization transactions to multiple functional blocks.

In examples, the hardware instance for each functional block to which receiving a broadcast message may be desired, may include the incorporation of one or more broadcast addresses and/or one or more broadcast enable bits. The broadcast message may be sent to the programmable broadcast address or address range. The broadcast enable bits may be used to enable/disable address decode for the programmable broadcast address or address range. One or more address masks may also be incorporated and may define the size of the address range. For simplicity, throughout the remainder of this disclosure the phrase "programmable broadcast address" will include one or more addresses and/or one or more address ranges.

In other words, the group of functional blocks requiring at least a portion of the same initialization programming may be structured and programed to enter a broadcast mode for receiving a broadcast image over a programmable broadcast address, the broadcast image may be written to the broadcast address and the group of functional blocks may all claim the associated writes, and then the group of functional blocks may be reprogrammed so they won't receive writes from a second image broadcast over the broadcast address. For example, if a chip had 9 functional blocks that required the same firmware image writes, each block may be separately and uniquely addressed at locations 1 through 9. Each block's unique address, 1 through 9, may be fixed and defined per instance at the chip's top level.

The initialization controller may then target a transaction to the multiple functional blocks by providing a programmable broadcast address in the chip's control status registers ("CSR"). For example, the programmable broadcast address may be location 0×010 within a block having a 0×200 sized address range. The programmable broadcast address may be set to any of the addresses within the address ranges of the 9 functional blocks, locations 1 through 9. A broadcast enable message or bit may be sent to functional blocks 1 through 9 and each block may switch from using the unique per-instance block address and begin using the programmable broadcast address defined in the CSR, such as example location 0×010. In other examples, a broadcast enable message or bit may be sent to functional blocks 2 through 9 and each block may switch from using the unique per-instance block address and begin using address 1.

This will allow each block to claim or receive any write transaction sent to the programmable broadcast address. Once all the writes for the same initialization firmware image have been sent to the programmable broadcast address, the initialization controller may send a message or bit to clear the broadcast mode for each block receiving write transactions broadcast to the programmable broadcast address or may send the message to all functional blocks within a chip. Each block may return to receiving transactions sent only to their unique address. In other examples, each block may be set such that they assume both the programmable broadcast address and their unique address at the same time. Each block may receive transactions sent to the unique address and to the programmable broadcast address either serially or simultaneously. Accordingly, the present disclosure may enable faster initializations saving precious computing time.

Accordingly, examples of the present disclosure may provide a method for initializing functional blocks on an electronic chip which may include writing a programmable broadcast address to one or more functional blocks in a broadcast group; setting the one or more functional blocks in the broadcast group to a broadcast enable mode; and writing one or more transactions to the programmable broadcast address. Example may further include disabling the broadcast enable mode.

In addition, examples may provide a system for initializing functional blocks on an electronic chip which may include an initialization controller; and instructions that may cause the initialization controller to write a programmable broadcast address to one or more functional blocks in a broadcast group; set the one or more functional blocks in the broadcast group to a broadcast enable mode; and write one or more transactions to the programmable broadcast address. Additional examples may include instructions that may cause the initialization controller to disable the broadcast enable mode.

Further examples may provide a non-transitory, computer-readable medium storing computer-executable instructions, which when executed, cause an initialization controller to write a programmable broadcast address to one or more functional blocks in a broadcast group; set the one or more functional blocks in the broadcast group to a broadcast enable mode; and write one or more transactions to the programmable broadcast address. Further examples my provide the non-transitory, computer-readable medium storing computer-executable instructions, which when executed, cause the initialization controller to disable the broadcast enable mode.

Figure 1:
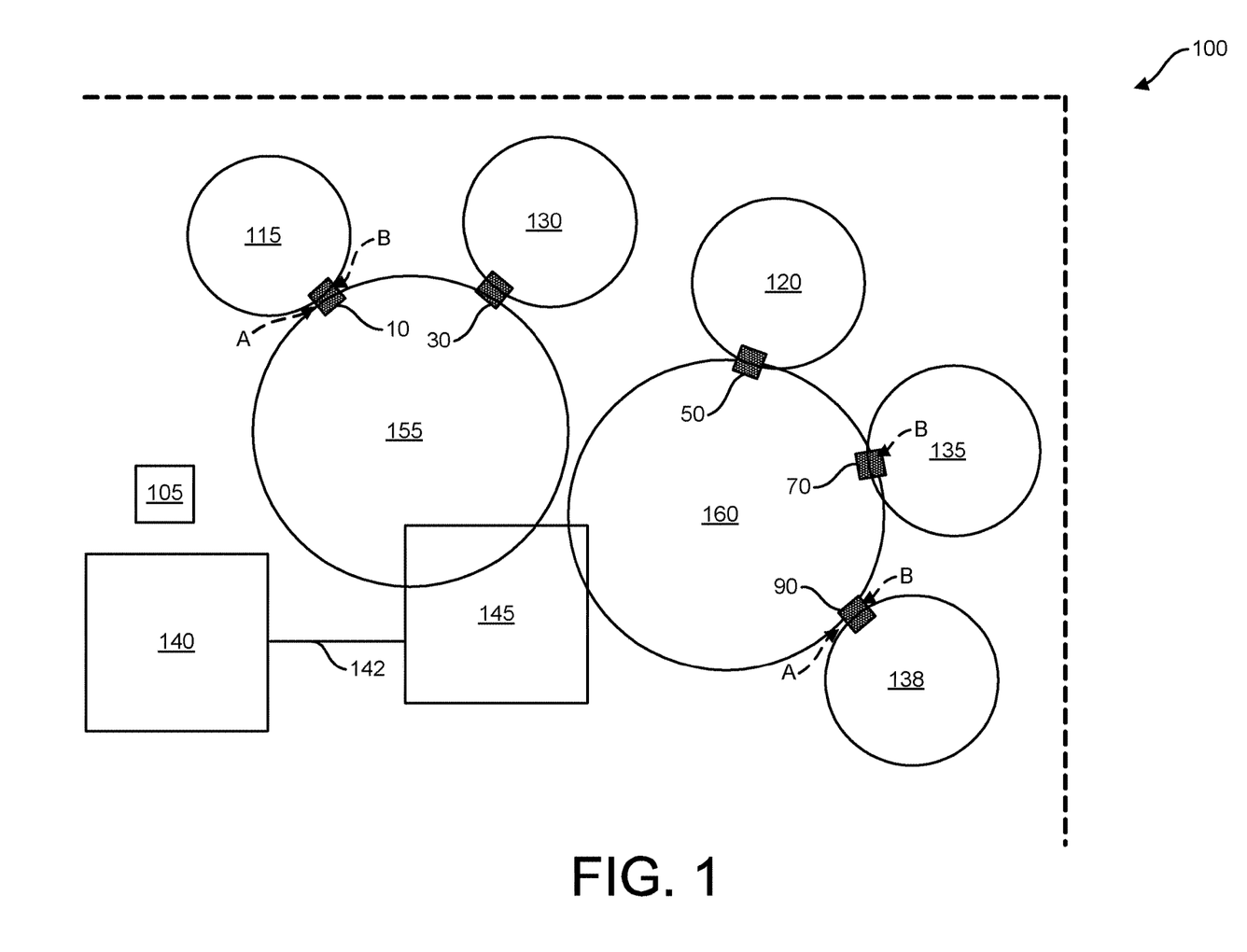
FIG. 1 depicts an example system of a control status register ("CSR") bus host and a plurality of chip level functional blocks on a portion of a chip, according to one or more examples disclosed.

Turning now to the drawings, FIG. 1 depicts an example system 100 of a CSR bus host 145 and a plurality of chip level functional blocks 115, 120, 130, 135, and 138 on a portion of a chip 105, according to one or more examples disclosed. The functional blocks 115, 120, 130, 135, and 138 may be or represent electronic circuits on the chip 105 and there may be many other electronic circuits on the chip 105. For example, there may be tens of millions, hundreds of millions, or more electronic circuits formed on the chip 105 for performing various functions. For simplicity, only five functional blocks, 115, 120, 130, 135, and 138 are shown on a portion of the chip 105.

For the remainder of this disclosure, functional blocks 120 and 130 may be unique functional blocks performing separate functions. Functional blocks 115, 135, and 138 may be the same functional blocks performing the same functions and may therefore constitute a "broadcast group", broadcast group A, as discussed further below. Functional blocks 115, 120, 130, 135, and 138 may be functional blocks requiring at least a portion of the same initialization programming at start up or on reset. These functional blocks 115, 135, and 138 may therefore form another "broadcast group", broadcast group B, in this example.

Each block 115, 120, 130, 135, and 138 may include CSR host clients 10, 30, 50, 70 and 90, respectively. Although depicted in a ring layout, such a layout is not required, and other topographies may be used in other examples. The layout may include the CSR bus host 145 with CSR host clients 10, 30, 50, 70 and 90. The CSR bus host 145 may interface with the CSR host clients 10, 30, 50, 70 and 90 via one or more CSR buses, two are shown CSR buses 155 and 160. The CSR host 145 may also interface with an initialization controller 140 via one or more buses 142, of which one is shown.

The CSR bus host 145 may startup upon power being introduced to the system 100 and may send instructions and receive status from various circuits around the chip 105, for example functional blocks 115, 120, 130, 135, and 138, and CSR host clients 10, 30, 50, 70 and 90. The initialization controller 140 may startup upon power being introduced to the system 100 and may independently, or in conjunction with the CSR bus host 145, send instructions and receive status from various circuits around the chip 105, for example functional blocks 115, 120, 130, 135, and 138, and CSR host clients 10, 30, 50, 70 and 90.

The CSR host clients 10, 30, 50, 70 and 90 may be distributed about or along the CSR buses 155 and 160. There may be any number of CSR host clients distributed about or along each of the CSR buses 155 and 160. The CSR buses 155 and 160 may be Panicle CSR Register Access Block ("PCRAB") client bus rings and the CSR host clients 10, 30, 50, 70 and 90 may be PCRAB clients distributed about the PCRAB bus rings. Each CSR host client 10, 30, 50, 70 and 90 may represent a single block, depicted herein as functional blocks 115, 120, 130, 135, and 138, but could each represent multiple functional blocks, not shown.

Each CSR host client 10, 30, 50, 70 and 90 may have a unique CSR address range. Each CSR host client 10, 30, 50, 70 and 90 may contain unique CSR address offsets on each of their respective rings or some or all may share the same CSR address offsets. For example, CSR host client 10 may include a CSR address range equal to 0×9100-0×9200, CSR host client 30 may include a CSR address range equal to 0×9400-0×9600, CSR host client 50 may include a CSR address range equal to 0×9800-0×9900, CSR host client 70 may include a CSR address range equal to 0×8000-0×8400, and CSR host client 90 may include a CSR address range equal to 0×8500-0×8600. CSR host clients 10 and 50 may have addresses in different CSR address offsets while CSR host clients 30 and 90 may share the same CSR address offsets and CSR host client 70 may share a subset of CSR address offsets, for example 0×50-0×100. It should be noted that all addresses utilized herein are for example purposes only and no limitations should be taken from their use. Any appropriate addressing strategies may be utilized.

During initialization, the initialization controller 140 and/or the CSR bus host 145 may send separate writes to each CSR host client 10, 30, 50, 70 and 90 utilizing their unique CSR address ranges. Any writes that fall within the CSR address range are allowed into the block, 115, 120, 130, 135, and 138, and accepted by the CSR host clients 10, 30, 50, 70 and 90 based on the full address the writes are sent to.

In one or more examples, one or more programmable broadcast addresses or spaces may be defined in a memory location, such as in a lookup table, to send messages to multiple CSR host clients at the same time, for broadcast enabled functional blocks. For example, to initialize a large memory structure via the CSR host client 10 in block 115 and the CSR host client 90 in block 138, a first broadcast group or broadcast group A, the broadcast space may be defined, in this example the broadcast space will be defined as 0×a000-0×a100. For simplicity, a single example will be described regarding a 16K static random access memory ("SRAM"), not shown, that may be accessible by an address CSR and a data CSR that may reside in an offset 0×100 within the functional blocks 115 and 138. Additionally, each CSR bus host 145 write may be performed separate from or in conjunction with the initialization controller 140. The CSR bus host 145 and the initialization controller 140 may be integrated into a single electronic circuit.

In this example, one or more writes may be sent to the data CSR to load the SRAM and the SRAM address may be automatically incremented. The address decode may be done at the logic implemented at a register, a distributed decode, or at a common location for each of the functional blocks 115, 138. For example, for a distributed decode block 115 and block 138 electronic circuits (not shown) may be designed to decode, from each write, the block 115, 138 address within one portion of the electronic circuits and a register address within a second portion of the electronic circuit. In other words, a Base Address Register ("BAR") may be utilized to inform the hardware what address range to decode on incoming transactions.

The CSR bus host 145 may write to block 115 to enable its broadcast mode, for example by utilizing the address 0×a050 to set a broadcast mode bit, and to set the programmable broadcast address to a given address, for this example 0×a000. The CSR bus host 145 may write to block 138 to enable its broadcast mode, for example by utilizing the address 0×a050 to set a broadcast mode bit, and to set the programmable broadcast address to the address for this example 0×a000. The CSR bus host 145 may then initialize the SRAM in both functional blocks 115 and 138 by broadcasting data to the address 0×a100 and the one or more writes will be claimed by both functional blocks 115 and 138. After completing all appropriate write operations, the broadcast mode may be cleared in both functional blocks 115 and 138 by clearing the broadcast mode bits by writing to the broadcast address. For example, by writing a 0 value in the broadcast mode bit utilizing an appropriate address, in this example the address 0×a050, the broadcast mode may be cleared. The functional blocks 115 and 138 may then claim writes sent only to their unique addresses.

In another example, a set of common CSRs in several functional blocks 115, 135 and 138, a second broadcast group or broadcast mode B, may be initialized. Here, functional blocks 115 and 138 may be the same block type and block 135 may be a different block type but may share a subset of CSR definitions with functional blocks 115 and 138. The subset of CSR definitions may reside in a particular offset, for this example the 0×50-0×100 offset. For simplicity, the functional blocks 115, 135 and 138 are assumed to share a common set of error status error register offsets and definitions and one or more writes may be sent to initialize the error status. To send the writes to all the affected blocks, the CSR bus host 145 may write to block 115 to enable its broadcast mode and set the programmable broadcast address to a given address, for this example 0×a000. Similarly, the CSR bus host 145 may write to block 135 to enable its broadcast mode and set the programmable broadcast address to 0×a000. The CSR bus host 145 may write to block 138 to enable its broadcast mode and set the programmable broadcast address to 0×a000. The CSR bus host 145 may then initialize the error status by broadcasting one or more writes to blocks 115, 135, and 138 using an appropriate address, for this example the address 0×a180 may be utilized The writes may then be simultaneously claimed by functional blocks 115, 135 and 138. After completing all appropriate write operations, the broadcast mode can be cleared in all three functional blocks, 115, 135, 138, by clearing the broadcast mode bits utilizing the address 0×a050. The functional blocks 115, 135 and 138 may then claim writes sent only to their unique addresses.

In the above examples, a unique programmable broadcast address is utilized but it is not necessary to use a unique address. The address for any block within a broadcast group may be used. For example, the address for block 115 may be selected as the programmable broadcast address for all the functional blocks in the broadcast group. With reference to the above example regarding initializing the error status, the CSR bus host 145 may send a write to block 135 to set its broadcast mode bit and set the programmable broadcast address an address uniquely utilized by block 115. The CSR bus host 145 may send a write to block 138 to set its broadcast mode bit and set the programmable broadcast address to the address uniquely utilized by block 115. The CSR bus host 145 may then initialize the error status by broadcasting one or more times using the programmable broadcast address. The writes may then be simultaneously claimed by functional blocks 115, 135 and 138. After completing all appropriate write operations, the broadcast mode may be cleared in both functional blocks, 135 and 138, by clearing the broadcast mode bits utilizing the programmable broadcast address for this example. The functional blocks 115, 135 and 138 may then only claim writes sent to their unique addresses. The addresses provided in the above examples are for example purposes only. Those skilled in the art would understand that any address, control and communication techniques may be utilized, and the example addresses are in no way limiting.

Figure 2:
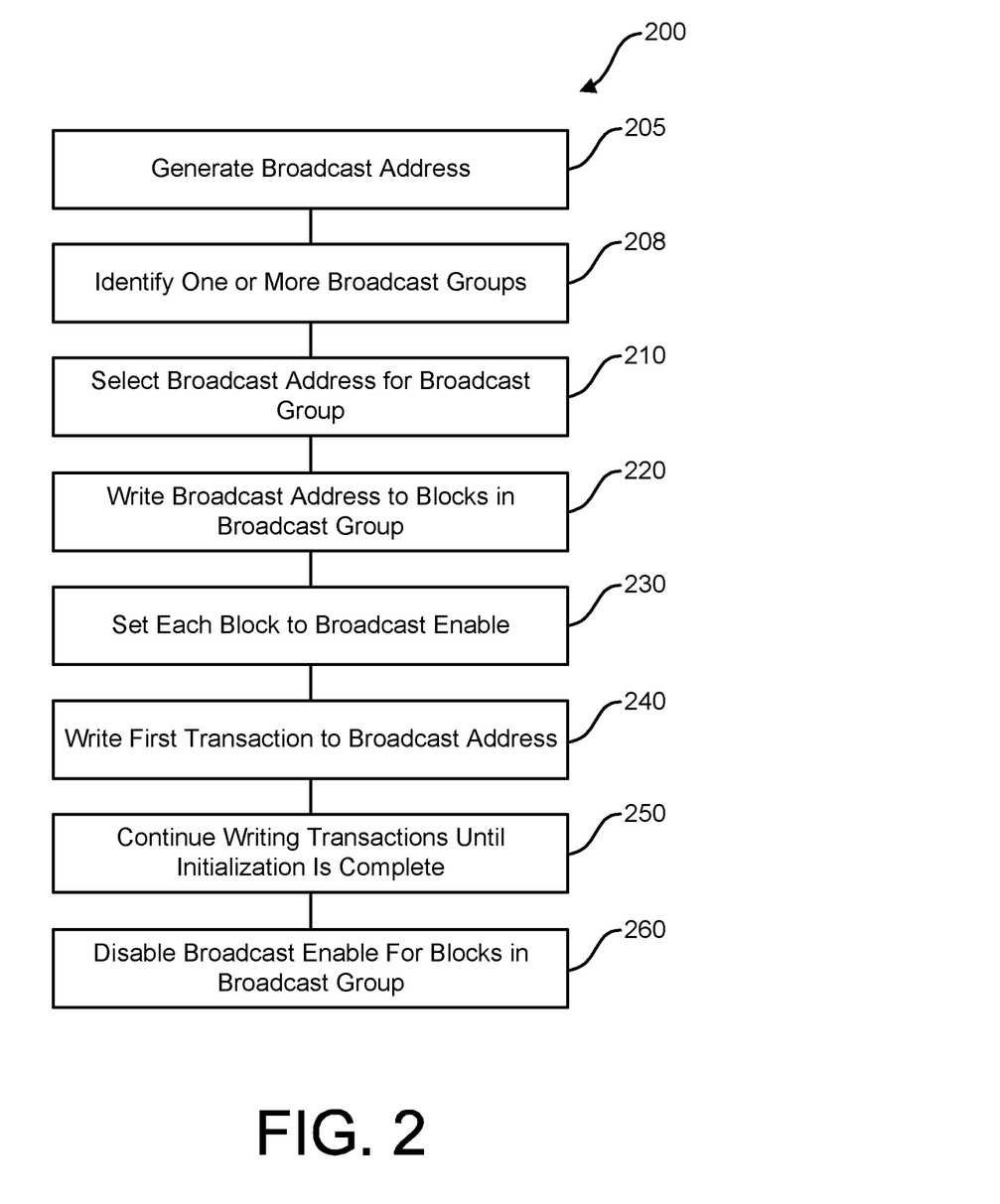
FIG. 2 is a flow chart depicting a method for initializing chips using a programmable broadcast address, according to one or more examples disclosed.

FIG. 2 is a flow chart depicting a method 200 for initializing chips using a programmable broadcast address, according to one or more examples disclosed. The method 200 may include an optional step of generating (block 205) one or more programmable broadcast addresses for use in writing to the broadcast group. The method 200 may include saving the one or more generated programmable broadcast addresses in a memory, for example in a lookup table. The method 200 may further include an optional step of identifying (block 208) one or more broadcast groups by identifying which functional blocks are the same block type and placing them in a broadcast group, for example through the use of metadata or lookup tables, and/or by identifying which functional blocks share a subset of CSR definitions and placing those functional blocks in another broadcast group, for example through the use of metadata or lookup tables. The method 200 may include an optional step of selecting (block 210) the programmable broadcast address for a broadcast group from a lookup table. The method 200 may include writing (block 220) the programmable broadcast address to functional blocks in the broadcast group; setting each block in the broadcast group to a broadcast enable mode (block 230); writing (block 240) one or more transactions to the programmable broadcast address; the optional step of continue writing transactions (block 250) until the number of appropriate writes has been completed and/or until initialization for at least one block in the broadcast group is complete; and disabling (block 260) the broadcast enable mode for the functional blocks in the broadcast group.

In examples, with reference to FIG. 1 and FIG. 2, selecting (block 210) the programmable broadcast address for a broadcast group may include selecting one or more broadcast groups from a look up table. A unique programmable broadcast address may be programmed or generated, for example by a user, by the initialization controller 140, or by the CSR bus host 145, by selecting an address that is different from all the addresses of all the clients on a chip. In examples, a unique address from one of the CSR host clients may be selected (block 210). Selecting (block 210) the programmable broadcast address for a broadcast group may include identifying (block 208) one or more broadcast groups based on which functional blocks are the same block type and which functional blocks share a subset of CSR definitions and selecting the programmable broadcast address for each broadcast group from one of the unique addresses from one of the CSR host clients in each of the broadcast groups.

Writing (block 220) the programmable broadcast address to functional blocks in the broadcast group; setting each block in the broadcast group to the broadcast enable mode (block 230); writing (block 240) one or more transactions to the programmable broadcast address; and continue writing transactions (block 250) until initialization for at least one block in the broadcast group is complete may include the CSR bus host 145 writing the transactions separate from or in conjunction with the initialization controller 140. The writes (blocks 220, 230, 240 and 250) may include the initialization controller 140 writing the messages and the CSR bus host 145 passing the writes onto the functional blocks in the broadcast group. Disabling (block 260) the broadcast enable mode for the functional blocks in the broadcast group may include the initialization controller 140 writing the messages and the CSR bus host 145 passing the writes onto the functional blocks in the broadcast group. Disabling (block 260) the broadcast enable mode for the functional blocks in the broadcast group may include the CSR bus host 145 writing the transaction separate from or in conjunction with the initialization controller 140.

A user may design or program a controller or host, such as the initialization controller 140 or the CSR bus host 145, to generate (block 205) one or more programmable broadcast addresses for use in writing to the broadcast group. The one or more programmable broadcast addresses may be predetermined during chip design based on the addresses for all the functional blocks and/or circuits on a given chip. In one or more examples, the one or more programmable broadcast addresses may be a unique, otherwise unused addresses. As described above, the programmable broadcast address may be an address assigned to a particular CSR host client in a block in a particular broadcast group, for example the CSR host clients 10, 70 or 90 associated with functional blocks 115, 135, or 135 respectively. The user may design or program the host utilizing a text editor in conjunction with or separate from any programming language including HDL, C, C++, C#, Python, PHP, JavaScript, and/or Ruby, to name a non-limiting few.

As discussed above, HDLs may include Verilog, SystemVerilog, VHDL, or other language. Verilog is an HDL used to model electronic systems. It is most commonly used in the design and verification of digital circuits at the register-transfer level. It may also be used in the design and verification of analog and mixed-signal circuits. The Verilog standard was merged into the SystemVerilog standard and is part of the SystemVerilog language. SystemVerilog is based on Verilog with some extensions. VHDL is another HDL used in electronic design automation. Verilog, SystemVerilog, and VHDL may all be used to design the functional blocks and other electronic structures within one or more chips or portions thereof.

Figure 3:
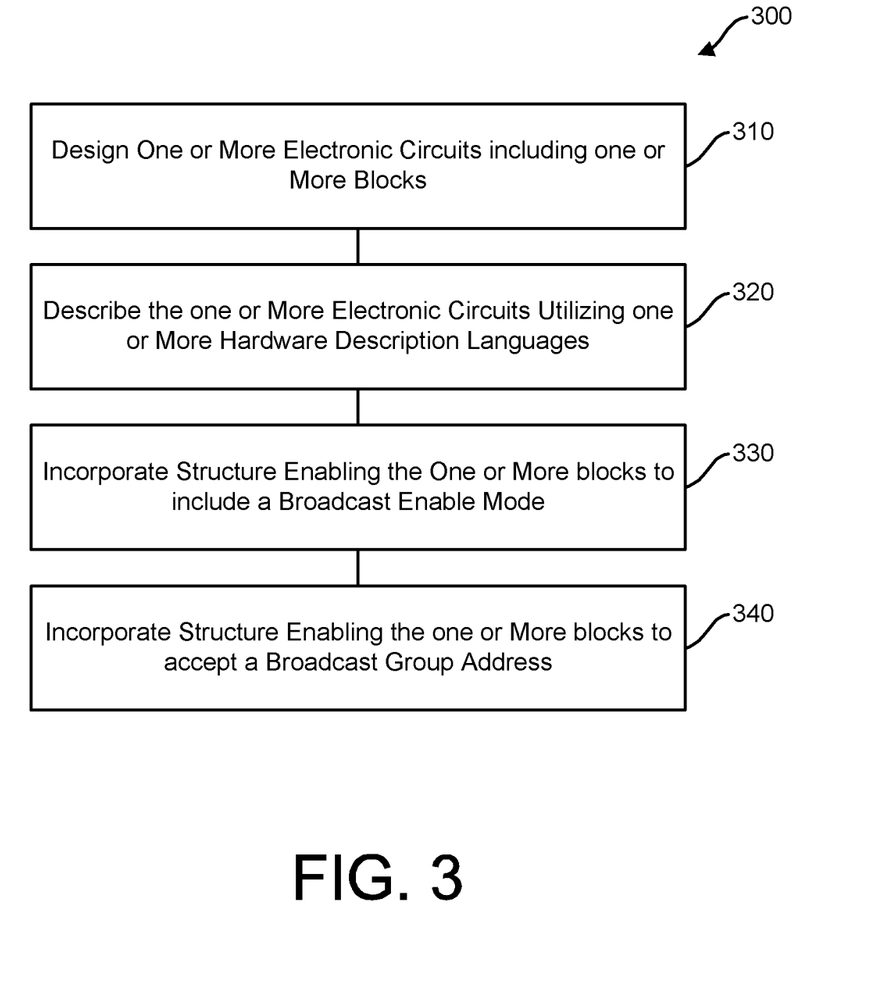
FIG. 3 is a flow chart depicting a method for incorporating one or more functional blocks within a chip to accept a programmable broadcast address, according to one or more examples disclosed.

FIG. 3 is a flow chart depicting a method 300 for incorporating one or more functional blocks within a chip to accept a programmable broadcast address, according to one or more examples disclosed. The method 300 may include a user designing (block 310) one or more electronic circuits that may include one or more functional blocks. Designing may be optional for existing circuits. The method 300 may include describing (block 320) the one or more electronic circuits that may include one or more functional blocks utilizing one or more HDLs; incorporating (block 330) structure enabling one or more functional blocks to include the broadcast enable mode ; and incorporating (block 340) structure enabling the one or more functional blocks to accept the programmable broadcast address.

In examples, with reference to FIG. 1, FIG. 2, and FIG. 3, the method 300 may include designing (block 310) by laying out the transistors by hand to incorporate the one or more functional blocks into the electronic circuits. The method 300 may include utilizing one or more HDLs to design and describe the one or more electronic circuits that include one or more functional blocks. There is no need that one or more HDLs be used to design (block 310) or describe (block 320) the one or more circuits that may include one or more functional blocks, nor to incorporate (block 330) the broadcast enable mode or incorporate (block 340) the acceptance of a programmable broadcast address into the one or more circuits that may include one or more functional blocks. Designing (block 310), describing (block 320), and incorporating (block 330, block 340) may include one or more drawings or one or more text files or other writings that include descriptions of the one or more circuits that may include one or more functional blocks therein.

Describing (block 320) one or more electronic circuits on a chip, for example chip 105, that may include one or more functional blocks utilizing one or more HDLs may include utilizing Verilog, SystemVerilog, and/or VHDL to describe the one or more circuits. The HDL descriptions may be used to create high-level representations of the one or more circuits including the one or more functional blocks from which lower-level representations and ultimately actual wiring may be derived. Accordingly, each chip may have functional blocks, for example functional blocks 115, 120, 130, 135, and 138 and associated CSR host clients 10, 30, 50, 70 and 90, formed thereon.

Incorporating (block 330) structure enabling the one or more functional blocks to include the broadcast enable mode may include utilizing one or more HDLs to incorporate the broadcast enable mode into the one or more functional blocks, for example functional blocks 115, 120, 130, 135, and 138. Incorporating (block 340) structure enabling the one or more functional blocks to accept a programmable broadcast address may include utilizing one or more HDLs to incorporate the capability into the one or more functional blocks.

Figure 4:
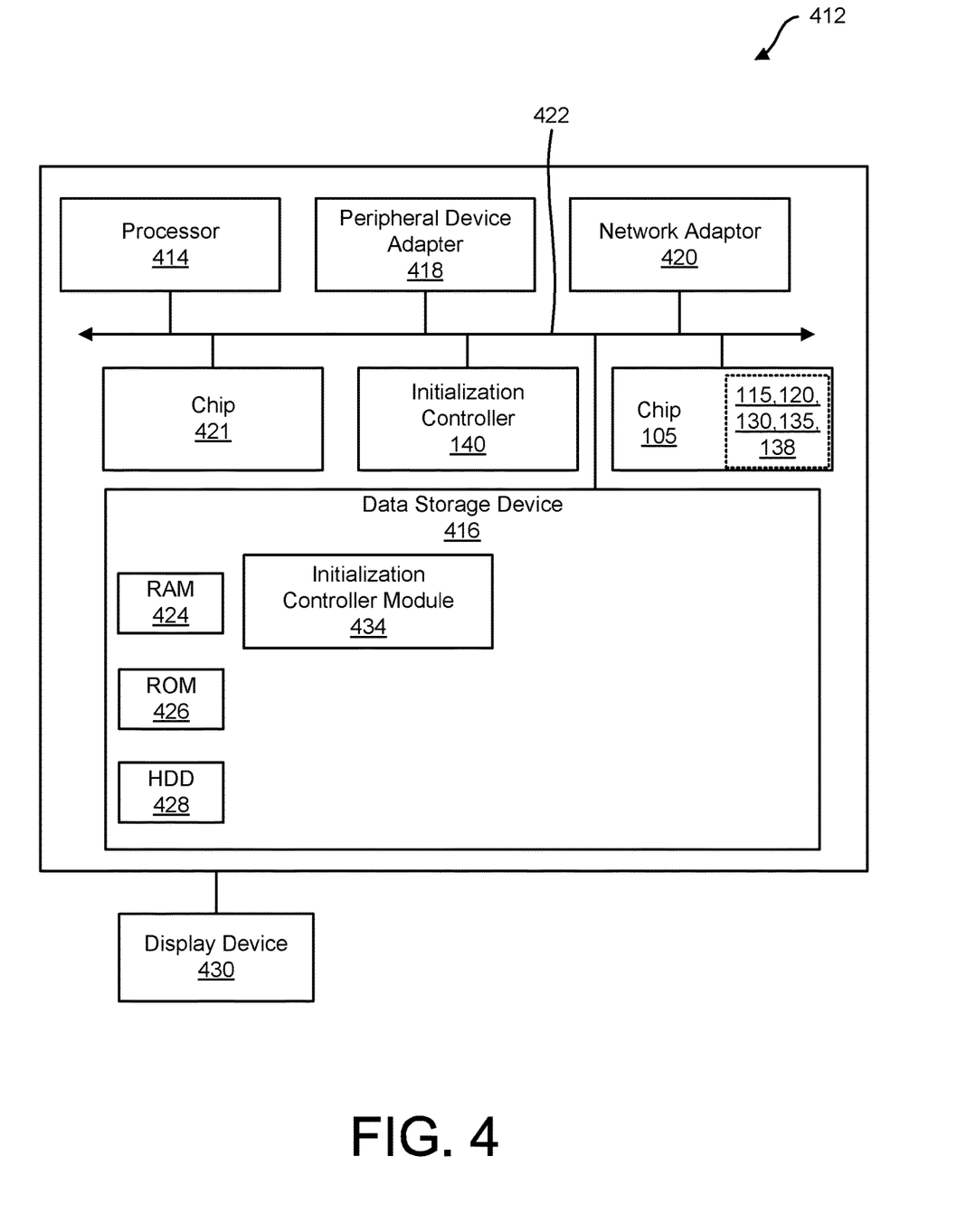
FIG. 4 is a computing system, according to one or more examples described.

FIG. 4 is a computing system 412, according to one or more examples described. The one or more chips, for example chip 105 and chip 421, may be or include field-programmable gate arrays ("FPGAs"), application specific integrated circuits ("ASICs"), chiplets, Multi-Chip-Modules, central processing units ("CPUs"), and system-on-chips ("SOCs"), to name a few. These chips may be used in a wide-range of applications, including but not limited to auto emission control, environmental monitoring, digital voice recorders, or other digital processing systems. ASICs may include entire microprocessors, memory blocks including read only memory (ROM), random access memory (RAM), erasable programmable read only memory (EPROM), electrically erasable programmable read only memory (EEPROM), flash memory and other building blocks and may be known as system-on-chip ("SoC"). The one or more chips may be or include one or more chips 421 and/or the chip 105, with reference to FIG. 1, FIG. 2, FIG. 3, and FIG. 4.

To achieve its desired functionality, the computing system 412 may include various hardware and software components. Among these components may be a number of processors 414, a number of chips 105, 421, and an initialization controller 140. These hardware components may be interconnected through the use of a number of electrical connections, busses, and/or network connections. In one example, the chip 105, the ship 421, and the initialization controller 140 may be communicatively coupled via a bus 422. The bus 422 may be or include the CSR buses 155 and 160 and/or the bus 142 (not shown).

The chip 105, the chip 421, the initialization controller 140, and/or an initialization controller module 434 may include, either separately or in some combination, the necessary software and hardware, including tangible, non-transitory computer readable medium (not shown), for initializing functional blocks within the computing system 412, with reference to FIG. 1, FIG. 2, FIG. 3, and FIG. 4.

Although shown separately, the initialization controller module 434 may be integrated within the initialization controller 140 and/or the processor 414. The initialization controller 140 may be integrated into the chip 105, the chip 421, and/or the processor 414. The chip 105 and/or the chip 421 may be integrated into the processor 414. Although the initialization controller module 434 is depicted as being internal to a data storage device 416, in other examples, the initialization controller module 434 may be a peripheral device (not shown) coupled to the computing system 412 or included within a peripheral device (not shown) coupled to the computing system 412. In other examples, the initialization controller 140 may be a peripheral device (not shown) coupled to the computing system 412 or included within a peripheral device (not shown) coupled to the computing system 412.

The initialization controller 140 and/or the initialization controller module 434 may include instructions that when executed by the initialization controller 140 may cause the initialization controller 140 to write a programmable broadcast address to one or more functional blocks, for example blocks 115, 120, 130, 135, and/or 138, within a broadcast group, for example and without limitation the broadcast group B with reference to FIG. 1, within the chip 105 and/or other functional blocks, not shown.

The instructions may, when executed by the initialization controller 140, cause the initialization controller 140 to implement at least the functionality of identifying one or more broadcast groups by identifying which functional blocks are the same block type and placing them in a broadcast group, for example through the use of metadata or lookup tables, and/or by identifying which functional blocks share at least a subset of CSR definitions and placing those functional blocks in another broadcast group, for example through the use of metadata or lookup tables; initializing the chip 105 and/or the chip 421 by selecting the programmable broadcast address for a broadcast group; writing the programmable broadcast address to the functional blocks in the broadcast group; setting each block in the broadcast group to the broadcast enable mode; writing one or more transactions to the programmable broadcast address; continue writing transactions until initialization for at least one block in the broadcast group is complete; and disabling the broadcast enable mode for the functional blocks in the broadcast group, as well as other functionality. In examples, the initialization controller 140 may work in conjunction with the processor 414 to implement the functionality described above. In examples, the initialization controller 140 may execute firmware code stored on the computing system 412, such as an initialization controller module 434. In examples, the initialization controller 140 and the initialization controller module 434 may be combined into a single module. The functionality of the computing system 412 and/or the initialization controller 140 is in accordance with the methods of the present specification described herein. In the course of executing code, the processor 414 and/or the initialization controller 140 may receive input from and provide output to a number of the remaining hardware units.

The computing system 412 may be implemented in an electronic device. Examples of electronic devices include servers, desktop computers, laptop computers, cloud based computers, personal digital assistants ("PDAs"), mobile devices, smartphones, gaming systems, and tablets, among other electronic devices. The computing system 412 may be utilized in any data processing scenario including, stand-alone hardware, mobile applications, through a computing network, or combinations thereof. Further, the computing system 412 may be used in a computing network, a public cloud network, a private cloud network, a hybrid cloud network, other forms of networks, or combinations thereof. In one example, the methods provided by the computing system 412 are provided as a service by a third party.

To achieve its desired functionality, the computing system 412 may include various other hardware components. Among these other hardware components may be a number of data storage devices or tangible, non-transitory computer readable medium 416, a number of peripheral device adapters 418, and a number of network adapters 420.

These hardware components may be interconnected through the use of a number of electrical connections, busses, and/or network connections. In one example, the processor 414, data storage device 416, peripheral device adapters 418, and a network adapter 420 may be communicatively coupled via a bus, for example the bus 422 as depicted in FIG. 4 or via a separate bus, not shown.

The processor 414 may include the hardware architecture to retrieve executable code from the data storage device 416 and execute the executable code. The executable code may, when executed by the processor 414, cause the processor 414 to implement at least the functionality of identifying one or more broadcast groups by identifying which functional blocks are the same block type and placing them in a broadcast group, for example through the use of metadata or lookup tables, and/or by identifying which functional blocks share at least a subset of CSR definitions and placing those functional blocks in another broadcast group, for example through the use of metadata or lookup tables; initializing the chips 105, 421 by selecting the programmable broadcast address for a broadcast group; writing the programmable broadcast address to the functional blocks in the broadcast group; setting each block in the broadcast group to the broadcast enable mode; writing one or more transactions to the programmable broadcast address; continue writing transactions until initialization for at least one block in the broadcast group is complete; and disabling the broadcast enable mode for the functional blocks in the broadcast group, as well as other functionality.

The data storage device 416 may store data such as executable program code that is executed by the processor 414, the initialization controller 140, or other processing devices. The processor 414 may be a central processing unit that is to execute an operating system in the computing system 412. As will be discussed, the data storage device 416 may specifically store computer code representing a number of applications that the processor 414 and/or the initialization controller 140 may execute to implement at least the functionality described herein.

The data storage device 416 may include various types of memory modules, including volatile and nonvolatile memory. For example, the data storage device 416 of the present example includes Random Access Memory ("RAM") 424, Read Only Memory ("ROM") 426, and Hard Disk Drive ("HDD") memory or storage 428. Many other types of memory may also be utilized, and the present specification contemplates the use of many varying type(s) of memory in the data storage device 416 as may suit a particular application of the principles described herein. In certain examples, different types of memory in the data storage device 416 may be used for different data storage needs. For example, in certain examples the processor 414 may boot from Read Only Memory ("ROM") 426, maintain nonvolatile storage in the Hard Disk Drive ("HDD") memory 428, and execute program code stored in Random Access Memory ("RAM") 424. In examples, the chip 105, and the chip 421 may boot from the Read Only Memory ("ROM") 426.

The data storage device 416 may include a computer readable medium, a computer readable storage medium, or a non-transitory computer readable medium, among others. For example, the data storage device 416 may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a RAM, a ROM, an EPROM, a Flash memory, a portable compact disc read-only memory ("CD-ROM"), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain or store a program for use by or in connection with an instruction execution system, apparatus, or device.

The hardware adapters 418, 420 in the computing system 412 may enable the processor 414 to interface with various other hardware elements, external and internal to the computing system 412. For example, the peripheral device adapters 418 may provide an interface to input/output devices, such as, for example, a display device 430, a mouse, and/or a keyboard. The peripheral device adapters 418 may also provide access to other external devices such as an external storage device, a number of network devices such as, for example, servers, switches, and routers, client devices, other types of computing devices, and combinations thereof.

The display device 430 may be provided to allow a user of the computing system 412 to interact with and implement the functionality of the computing system 412. Examples of display devices 430 include a computer screen, a laptop screen, a mobile device screen, a personal digital assistant ("PDA") screen, and a tablet screen, among other display devices 430.

The peripheral device adapters 418 may also create an interface between the processor 414 and the display device 430, a printer, or other media output devices. The network adapter 420 may provide an interface to other computing devices within, for example, a network, thereby enabling the transmission of data between the computing system 412 and other devices located within the network. The network adapter 420 may provide an interface to an external telecommunications network such as a cellular phone network or other radio frequency enabled network, thereby enabling the transmission of data between the computing system 412 and other external devices such as an external storage device, a number of network devices such as, for example, servers, switches, and routers, client servers, radio frequency enabled devices, other client devices, other types of computing devices, and combinations thereof.

The computing system 412 may further includes a number of modules used in the implementation of the systems and methods described herein. The various modules within the computing system 412 may include executable program code that may be executed separately. In this example, the various modules may be stored as separate computer program products. In another example, the various modules within the computing system 412 may be combined within a number of computer program products; each computer program product including a number of the modules.

Figure 5:
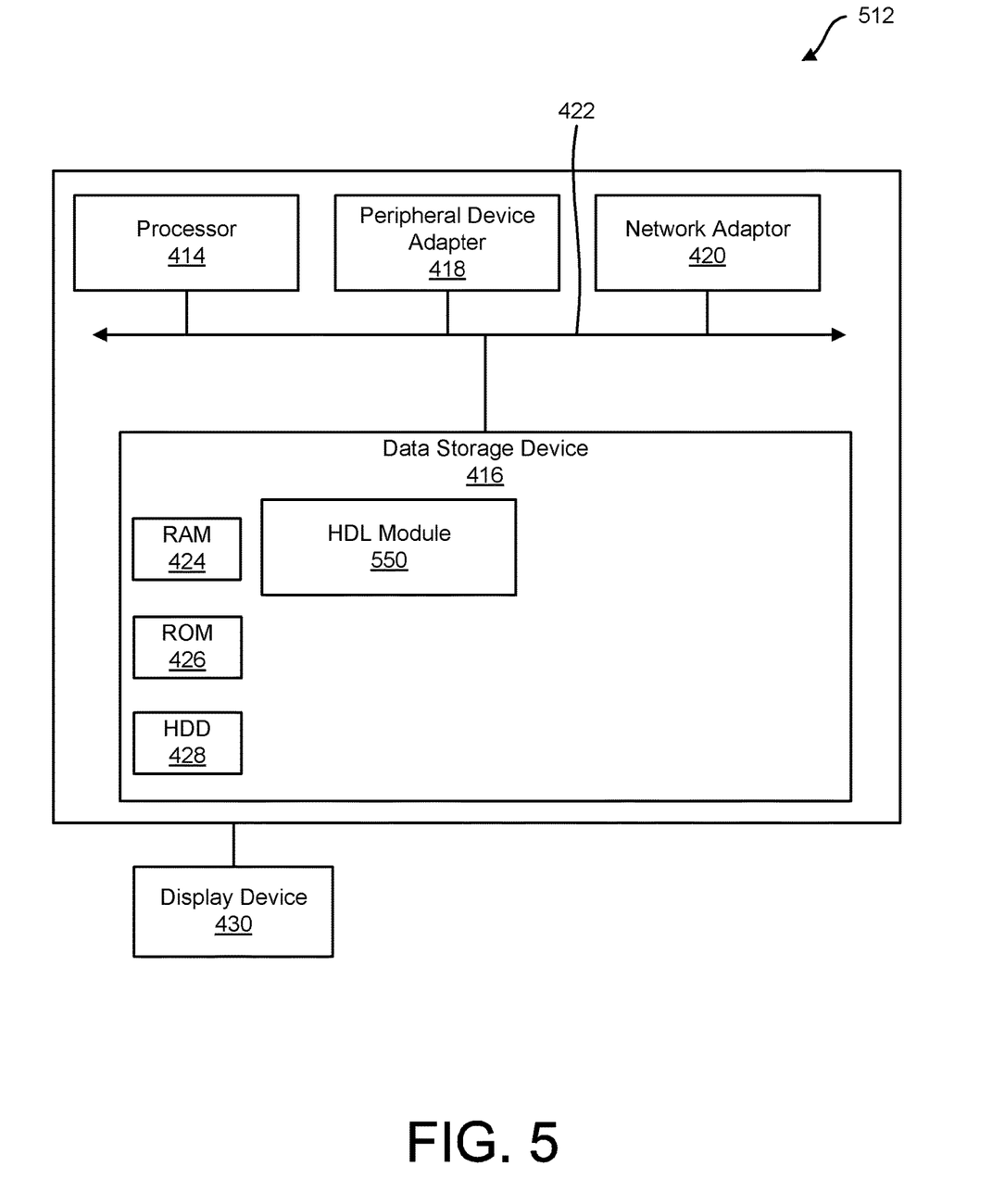
FIG. 5 is a computing system for describing electronic circuits, according to one or more examples described.

FIG. 5 is a computing system 512 for describing electronic circuits, according to one or more examples described. The computing system 512 may include an HDL module 550 for describing electronic circuits. The computing system 412 may, when executed by the processor 414, display a number of graphical user interfaces ("GUIs") (not shown) on the display device 430 associated with the executable program code representing the number of applications stored on the data storage device 416. The GUIs may display, for example, interactive screenshots that allow a user to interact with the computing system 412 to input commands in association with the HDL module 550 to implement at least the functionality of a user designing one or more electronic circuits that may include one or more functional blocks; and/or describing one or more electronic circuits that may include one or more functional blocks; incorporating structure enabling the one or more functional blocks to include the broadcast enable mode; and incorporating structure enabling the one or more functional blocks to accept a broadcast group address.

The HDL module 550 may include the necessary software and hardware, including the tangible, non-transitory computer readable medium, to implement the functions described above, with reference to FIG. 3, and FIG. 5.

Although the HDL module 550 is depicted as being internal to the data storage device 416, in other examples, HDL module 550 may be a peripheral device coupled to the computing system 512 or included within a peripheral device coupled to the computing system 512. Although the HDL module 550 is depicted as a separate module, it may be integrated with many other modules within the computing system 512 including the processor 414.

Figure 6:
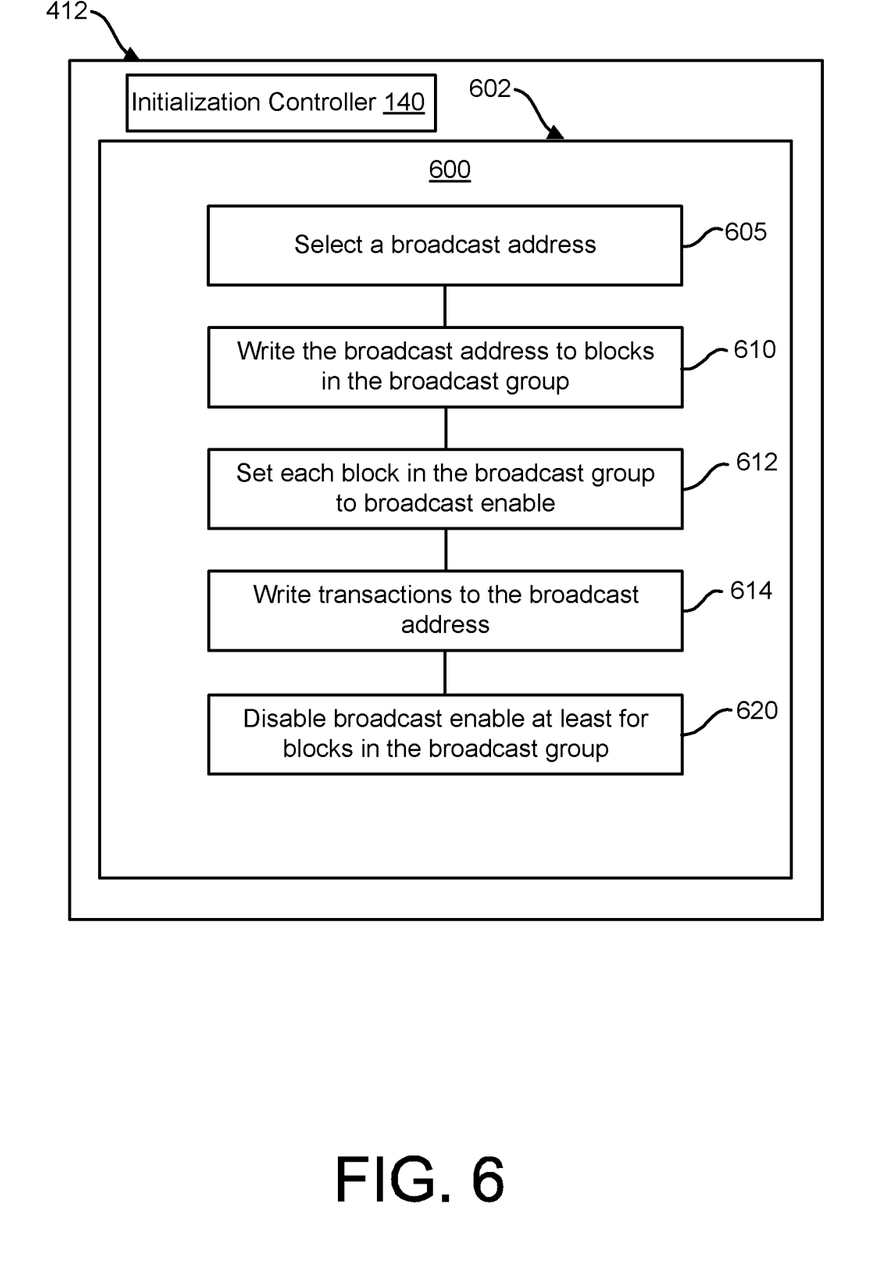
FIG. 6 is a computing device including an initialization controller and a non-transitory computer-readable medium including computer-executable instructions stored thereon within the computing system of FIG. 4, according to one or more examples described.

FIG. 6 is a computing device including the initialization controller 140 and a non-transitory computer-readable medium 602 including computer-executable instructions 600 stored thereon within the computing system of FIG. 4, according to one or more examples described. When the computer-executable instructions 600 are executed by the initialization controller 140, the computer-executable instructions 600 may cause the initialization controller 140 to select (block 605) the programmable broadcast address for a broadcast group. The programmable broadcast address may be selected from a memory location, for example from metadata, a lookup table, or other memory location. The computer-executable instructions 600 may cause the initialization controller 140 to write (block 610) the programmable broadcast address to functional blocks in the broadcast group; set each block in the broadcast group to the broadcast enable mode (block 612); write (block 614) one or more transactions to the programmable broadcast address until the number of appropriate writes has been completed; and disable (block 620) the broadcast enable mode for the functional blocks in the broadcast group, as well as other functionality. For example, when the computer-executable instructions 600 are executed by the initialization controller 140, the computer-executable instructions 600 may cause the initialization controller 140 to generate one or more programmable broadcast addresses. In another example, the computer-executable instructions 600 cause the initialization controller 140 to set the functional blocks in the broadcast group to the broadcast enable mode by writing a broadcast mode bit to each functional block in the broadcast group.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for initializing functional blocks on an electronic chip, comprising:
    writing a programmable broadcast address to one or more functional blocks in a broadcast group with the programmable broadcast address corresponding to an address of a memory location within the one or more functional blocks;
    setting the one or more functional blocks in the broadcast group to a broadcast enable mode; and
    writing one or more transactions to the programmable broadcast address.

2. The method of claim 1, further comprising identifying two or more functional blocks that share at least a subset of control status register ("CSR") definitions.

3. The method of claim 2, further comprising placing the two or more functional blocks in the broadcast group.

4. The method of claim 1, further comprising selecting, from a memory location, the programmable broadcast address for the broadcast group.

5. The method of claim 1, further comprising generating the programmable broadcast address for the broadcast group.

6. The method of claim 1, wherein setting the one or more functional blocks in the broadcast group to the broadcast enable mode comprises writing a broadcast mode bit to each functional block in the broadcast group.

7. The method of claim 1, wherein writing a programmable broadcast address to one or more functional blocks in a broadcast group comprises writing the programmable broadcast address to a unique address for at least one of the functional blocks in the broadcast group.

8. The method of claim 1, further comprising disabling the broadcast enable mode, wherein disabling the broadcast enable mode comprises clearing a broadcast mode bit in each functional block in the broadcast group.

9. The method of claim 1, wherein each functional block in the broadcast group comprises one or more host clients distributed around one or more buses.

10. The method of claim 9, wherein the one or more buses are Panicle control status register ("CSR") Register Access Block ("PCRAB") client bus rings.

11. A system for initializing functional blocks on an electronic chip comprising:
    an initialization controller; and
    instructions that when executed by the initialization controller cause the initialization controller to:
        write a programmable broadcast address to one or more functional blocks in a broadcast group with the programmable broadcast address corresponding to an address of a memory location within the one or more functional blocks;

set the one or more functional blocks in the broadcast group to a broadcast enable mode;

write one or more transactions to the programmable broadcast address; and disable the broadcast enable mode.

12. The system of claim 11, wherein the instructions further cause the initialization controller to identify two or more functional blocks that share at least a subset of control status register definitions.

13. The system of claim 12, wherein the instructions further cause the initialization controller to place the two or more functional blocks in the broadcast group.

14. The system of claim 11, wherein the instructions further cause the initialization controller to select the programmable broadcast address for the broadcast group.

15. The system of claim 11, wherein the instructions further cause the initialization controller to generate the programmable broadcast address for the broadcast group.

16. The system of claim 15, wherein the instructions further cause the initialization controller to write a broadcast mode bit to each functional block in the broadcast group.

17. The system of claim 11, wherein the instructions further cause the initialization controller to clear the broadcast mode bit in each functional block in the broadcast group.

18. A non-transitory, computer-readable medium storing computer-executable instructions, which when executed, cause an initialization controller to:

write a programmable broadcast address to one or more functional blocks in a broadcast group with the programmable broadcast address corresponding to an address of a memory location within the one or more functional blocks;

set the one or more functional blocks in the broadcast group to a broadcast enable mode;

write one or more transactions to the programmable broadcast address; and disable the broadcast enable mode.

19. The non-transitory, computer-readable medium of claim 18, wherein the computer-executable instructions further cause the initialization controller to select, from a memory location, the programmable broadcast address for the broadcast group.

20. The non-transitory, computer-readable medium of claim 18, wherein the computer-executable instructions further cause the initialization controller to set the one or more functional blocks in the broadcast group to the broadcast enable mode by writing a broadcast mode bit to each functional block in the broadcast group.

* * * * *